(12) United States Patent
Kalin

(10) Patent No.: US 8,762,217 B2
(45) Date of Patent: Jun. 24, 2014

(54) SYSTEMS AND METHODS FOR SEARCHING IN AN ELECTRONIC COMMERCE ENVIRONMENT

(75) Inventor: Robert Kalin, Brooklyn, NY (US)

(73) Assignee: Etsy, Inc., Brooklyn, NY (US)

( * ) Notice: Subject to any disclaimer, the term of this patent is extended or adjusted under 35 U.S.C. 154(b) by 116 days.

(21) Appl. No.: 12/951,660

(22) Filed: Nov. 22, 2010

(65) Prior Publication Data
US 2012/0130847 A1    May 24, 2012

(51) Int. Cl.
*G06Q 30/00*    (2012.01)

(52) U.S. Cl.
USPC ........................................................ 705/26.1

(58) Field of Classification Search
CPC .......................................... G06Q 30/06–30/08
USPC .................................................. 705/26–27.2
See application file for complete search history.

(56) References Cited

U.S. PATENT DOCUMENTS

| | | | |
|---|---|---|---|
| 7,788,212 B2 * | 8/2010 | Beckmann et al. ........... | 707/622 |
| 2002/0107853 A1 | 8/2002 | Hofmann et al. | |
| 2003/0028498 A1 | 2/2003 | Hayes-Roth | |
| 2003/0059030 A1 * | 3/2003 | Tenorio .......................... | 379/300 |
| 2006/0282304 A1 | 12/2006 | Bedard et al. | |
| 2008/0133375 A1 | 6/2008 | Torrenegra | |
| 2010/0030578 A1 | 2/2010 | Siddique et al. | |
| 2010/0169297 A1 | 7/2010 | Haveliwala et al. | |

FOREIGN PATENT DOCUMENTS

WO    0227601 A2    4/2002

OTHER PUBLICATIONS

"Search Strategies" (School Libraries in Canada; 2000; vol. 20., No. 1, p. 29, ProQuest Central).*
International Search Report and Written Opinion for INternational Application No. PCT/US2011/061626 mailed Mar. 5, 2012, 50 pages.

* cited by examiner

*Primary Examiner* — Jason Dunham
*Assistant Examiner* — Ethan D Civan
(74) *Attorney, Agent, or Firm* — Lando & Anastasi, LLP

(57) ABSTRACT

A method of searching an electronic commerce website includes searching a plurality of user profiles based upon a user-supplied search query for an item, establishing an interactive online session between the user and the at least one search facilitator, and providing for the at least one search facilitator to present one or more suggested item listings to a user through the electronic commerce website. The searching identifies at least one search facilitator profile among the plurality of user profiles. The search facilitator profile represents a search facilitator who can assist the user in locating the item within the electronic commerce website.

18 Claims, 4 Drawing Sheets

SYSTEMS AND METHODS FOR SEARCHING IN AN ELECTRONIC COMMERCE ENVIRONMENT

BACKGROUND OF THE INVENTION

1. Field of Invention

Embodiments of the present invention relate generally to electronic commerce, and more specifically, to online searches for items within an electronic commerce environment.

2. Discussion of Related Art

Many online resources provide utilities that support searches for information, such as items for sale at an electronic commerce website (also referred to herein as an e-commerce website). To begin a search, typically a website user supplies one or more search terms that are descriptive of the information sought to a search engine within the website. The search engine then processes the search query to identify relevant results from a collection of information (e.g., stored within a database), and then returns the results to the user. The results are automatically generated using algorithms that attempt to match the search query against information in the collection. Being automated, the quality of the results returned by the search engine is largely dependent upon the specificity of the search query, the specificity of the information in the collection, and the ability of the search algorithms to locate and identify information relevant to the query. In some cases, the search results may not be accurate, current, relevant, or satisfactory to the user.

BRIEF SUMMARY OF THE INVENTION

According to one embodiment, a method of searching an electronic commerce website includes acts of searching a plurality of user profiles based upon a user-supplied search query for an item, establishing an interactive online session between the user and the at least one search facilitator, and providing for the at least one search facilitator to present one or more suggested item listings to a user through the electronic commerce website. The searching identifies at least one search facilitator profile among the plurality of user profiles. The search facilitator profile represents a search facilitator who can assist the user in locating the item within the electronic commerce website.

In another embodiment, the method may further include an act of interrogating the user for additional information about the item prior to the act of searching. The act of searching may be further based upon the additional information. The act of interrogating may include presenting, within an interface of the electronic commerce website, one or more questions to the user. The questions may be generated, for example, based on heuristics rules applied to the user-supplied search query and/or one or more user-supplied responses to each of one or more previously presented questions. The additional information may be received from the user in response to posing the one or more questions. The act of interrogating may include generating a web page having a user interface configured to enable the user to receive and respond to the act of interrogating. In another embodiment, the questions may be survey questions, poll questions, or a combination of both. In yet another embodiment, the questions may be manually generated based on the user-supplied search query, one or more user-supplied responses to each of one or more previously presented questions, or a combination of both.

In another embodiment, the act of establishing an interactive online session may include generating a web page having a user interface configured to enable the user to communicate with the at least one search facilitator. The interactive online session may be a web chat session, an instant messaging session, or a teleconference. In another embodiment, the act of providing for the search facilitator to present one or more suggested item listings to the user may include generating a web page configured to display the suggested item listings.

According to another embodiment, a method of searching for an item within an electronic commerce platform includes receiving, by a computing system of the electronic commerce platform, a search query and a request for advanced search results from a user of a client computing system, responding to the request for advanced search results by generating a first web page having a first user interface configured to enable the computing system to interrogate the user, and transmitting the first web page to the client computing system. The method further includes interrogating the user, based on the search query, for additional information about the item through the first user interface, identifying one or more search facilitators based on the search query and/or the additional information, and generating, subsequent to identifying the search facilitators, a second web page including a second user interface configured to enable the computing system to establish an interactive session between the user and at least one of the search facilitators. The method further includes transmitting the second web page to the client computing system, and establishing, by the computing system, an interactive session between the user and at least one of the search facilitators through the second user interface. The interactive session enables the user and the search facilitators to communicate with each other.

In another embodiment, the method may further include providing, by the computing system, for each of the search facilitators to present representations of one or more suggested items to the user through a third web page that is transmitted to the client computing system. The one or more suggested items may be selected by the search facilitators. The representations of the suggested items may be included in a curated list.

In another embodiment, interrogating the user for additional information about the item may include presenting to the user, within an interface of the electronic commerce website, one or more open-ended questions based on the search query and receiving one or more responses to the open-ended questions from the user. The responses may include the additional information.

In another embodiment, interrogating the user for additional information about the item includes presenting to the user, within an interface of the electronic commerce website, one or more poll questions based on the search query and receiving one or more responses to the one or more poll questions from the user, the one or more responses including the additional information. In one embodiment, the interactive session may be a live chat, a live poll, or a live survey. In another embodiment, each of the search facilitators may be one of a plurality of users of the electronic commerce platform. In yet another embodiment, the search facilitators may include one or more people who each have prepared a curated list having items related to the search query and/or the additional information.

In another embodiment, the method may further include performing, by the computing system, a search based on the search query, and may further include generating, by the computing system, a set of search results based on the performed search. The set of search results may include representations of one or more listed items that are related to the item being searched for. The set of search results may be included within the first web page or the second web page. According to one embodiment, the method may further include transmitting the search query and/or the additional information to one or more of the search facilitators. According to yet another embodiment, the search query and/or the additional information may be transmitted to one or more of the search facilitators that are selected by the user.

In another embodiment, the method may further include providing for at least one of the search facilitators to receive compensation for providing assistance to the user in obtaining the item. The compensation may be a percentage of a payment made by the user to obtain the item.

According to another embodiment, an electronic commerce system includes a search engine for searching a user database based on a user-supplied search query for an item. The search engine is configured to identify at least one search facilitator profile among a plurality of user profiles stored within the user database. The search facilitator profile represents a search facilitator who can assist the user in locating the item among a plurality of items listed within the electronic commerce system. The system further includes an interactive session component configured to establish an interactive online session between the user and the search facilitator, and a web server component configured to generate a web page including one or more suggested item listings to be presented by the search facilitator to the user.

In another embodiment, the system may further comprise an interrogation component configured to interrogate the user for additional information about the item prior to identifying the at least one search facilitator. The search engine may be further configured to search the user database based upon the additional information. According to one embodiment, the additional information about the item includes a size of the item, a color of the item, a quantity of the item, a texture of the item, a material of the item, a method of construction of the item, a method of manufacture of the item, a purpose for the item, a use of the item, a theme of the item, a style of the item, a location of the item, or any combination therein.

In yet another embodiment, the interrogation component is configured to interrogate the user using a survey question, a poll question, an open-ended question, a manually generated question, or a combination of these. The manually generated question is based on the user-supplied search query and/or one or more user-supplied responses to at least one previously presented survey question, previously presented poll question, previously presented open-ended question, and/or previously presented manually generated question.

In another embodiment, the interactive session component is further configured to generate a web page having a user interface configured to enable the user to communicate with the at least one search facilitator. The interactive online session may be a web chat session, an instant messaging session, or a teleconference.

According to one embodiment, a computer readable medium has computer-executable instructions stored thereon for searching an electronic commerce website. The computer-executable instructions, when executed by a computer, cause the computer to perform a method of searching an electronic commerce website. The method includes acts of searching a plurality of user profiles based upon a user-supplied search query for an item, establishing an interactive online session between the user and the at least one search facilitator, and providing for the at least one search facilitator to present one or more suggested item listings to a user through the electronic commerce website. The searching identifies at least one search facilitator profile among the plurality of user profiles. The search facilitator profile represents a search facilitator who can assist the user in locating the item within the electronic commerce website.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION OF THE INVENTION

Figure 1:
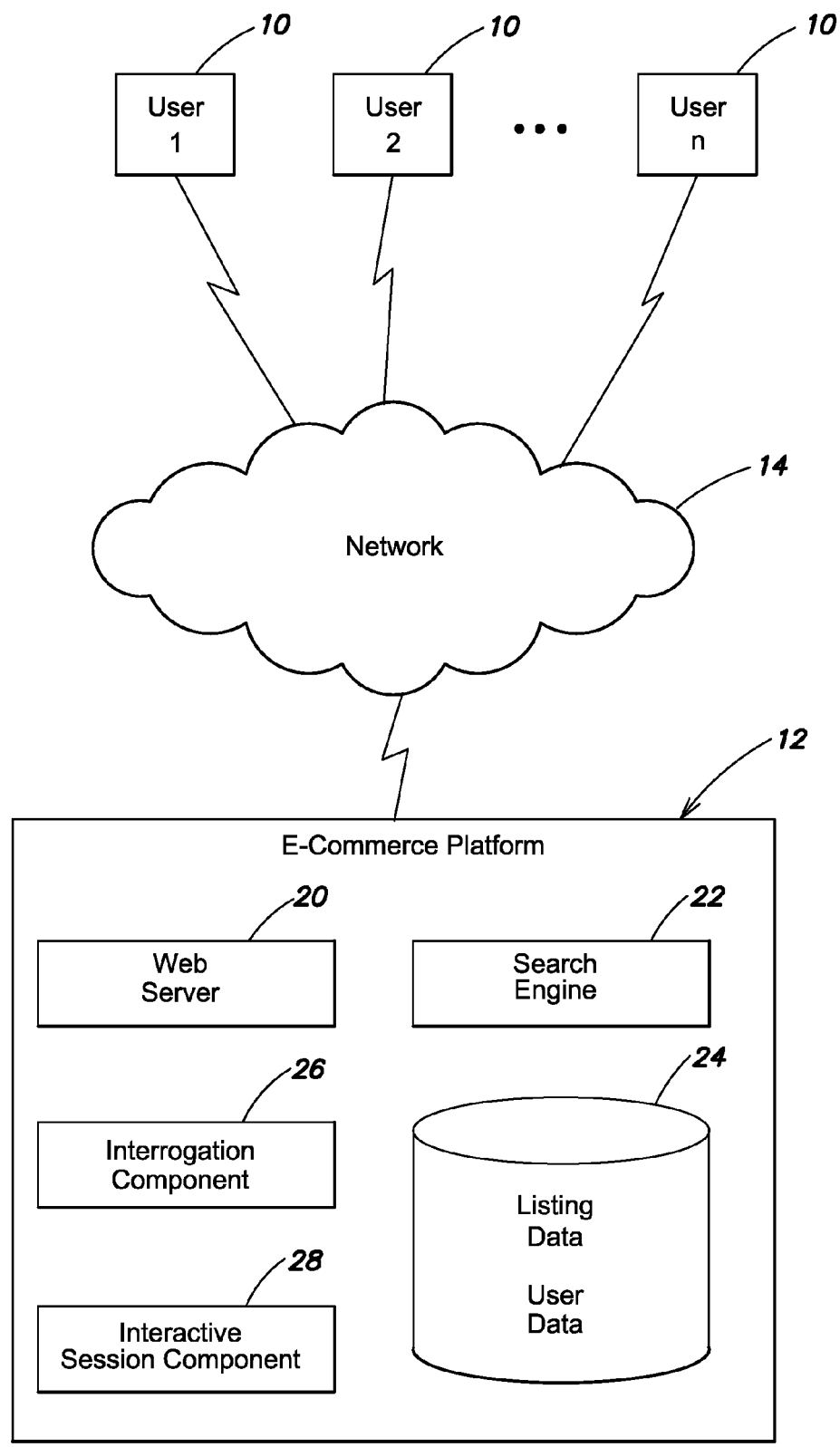
FIG. 1 is a block diagram of an e-commerce system having advanced search functionality in accordance with one embodiment of the present invention.

Embodiments of the invention are not limited in their application to the details of construction and the arrangement of components set forth in the following description or illustrated in the drawings. Embodiments of the invention are capable of other embodiments and of being practiced or of being carried out in various ways. Also, the phraseology and terminology used herein is for the purpose of description and should not be regarded as limiting. The use of "including," "comprising," "having," "containing," "involving," and variations thereof herein is meant to encompass the items listed thereafter and equivalents thereof as well as additional items.

Embodiments of the present disclosure provide systems and methods for performing facilitated online searches within an e-commerce platform. The e-commerce platform supports an online marketplace where goods, services, and other articles of commerce can be bought and sold over the Internet or other computer networks. The goods and services may be physical and tangible, or virtual (e.g., privileges for accessing restricted content on a website, discount offers, or other non-physical goods). The e-commerce platform may be tailored to serve particular purposes, such as business-to-business commerce (e.g., wholesale), business-to-consumer commerce (e.g., on-line retail), private sales, auctions, or individual store fronts, and may even be further specialized to support a particular marketplace (e.g., for clothing, housewares, or artwork). The e-commerce platform may provide features that facilitate activity within the marketplace, such as search engines, social media (e.g., on-line forums, blogs, social networks, shared photo and video albums, wilds, netmeetings, and virtual entertainment), financing and payment tools (e.g., banking, fund transfer, credit services), shipping and freight services, among others. The e-commerce platform may be backed by so-called "brick-and-mortar" facilities, such as retail stores, distribution warehouses, and the like, or the e-commerce platform may merely be an electronic facilitator of trading markets between independent individuals and businesses.

Using a Search Engine to Identify Search Facilitators

According to one aspect of the present invention, an e-commerce website supported by the e-commerce platform hosts listings for large numbers of saleable items, often counted in the tens or hundreds of millions of items at any given time. It will be understood that an "item," as used herein, refers to a good, a service, an article of commerce, or any combination thereof. According to various embodiments of the disclosure, the systems and methods disclosed herein provide advanced searches for items listed at the e-commerce website, as well as for items that are sold or traded through channels other than the website. An advanced search includes, but is not limited to, a search that is facilitated by people (also referred to herein as search facilitators) other than a website user who initiates the search. For example, after the user initiates the search, the e-commerce platform may identify one or more search facilitators who are likely to be able to assist the user with the search. Search facilitators include other users of the website. The website enables the user to interact with the search facilitator(s) (e.g., through online messaging, e-mail, voice mail, and the like) to further the search process.

For the user, locating an item of interest within an online marketplace can be extraordinarily difficult, if not impossible, without the aid of automated search utilities that can mine massive amounts of data easily, quickly, and effectively to identify and locate information relevant to the user's interest. Generally speaking, computer implemented algorithms are used to facilitate online searches for information, and in particular searches for items that are offered for sale at an e-commerce website. Some of these algorithms attempt to generate relevant search results by comparing the terms of a user-supplied search query with various keywords or other identifying information that is associated with each item, such as an item title or description. For example, a user who is looking for a woolen scarf may enter a search query such as "wool scarf" into the search utility of the website. In turn, the search utility mines data associated with a plurality of items that are currently listed on the website, looking for any item that has the words "wool" and "scarf," or similar terms, generates a list of such items, and presents the list to the user. The user may then refine the search to narrow or improve the results, begin a new search, or select one or more of the items in the list to learn more about that particular item or to purchase it.

According to one aspect of the present invention, it is appreciated that one limitation of this automated approach to online searching is that the approach cannot account for specialized expertise and subjective judgments that human beings are uniquely capable of, which limits the quality and quantity of relevant search results. For example, a person having specialized knowledge with respect to certain items (similar to a personal shopper), or a class of items, may be well suited to assist a buyer seeking those items by offering suggestions or advice on how to locate and acquire the items. Furthermore, people are social creatures by nature, and often find higher levels of satisfaction and gratification when they are able to interact with other people when buying or selling goods. This is particularly true in marketplaces for handmade and vintage goods, which draw people who enjoy and appreciate crafts and hobbies that exemplify the spirit of human creativity and individualism. Such people are well suited to assist the user in locating relevant items in a way that computers cannot replicate, and therefore are able to provide value to the user. Also, it is appreciated that in certain online marketplaces, not all items that are potentially available for sale may be listed on the website at any given time, yet one knowledgeable with the marketplace can potentially assist with locating unlisted items of interest to the user.

According to one aspect of the present invention, it is appreciated that a user will be able to find items of interest more easily using an e-commerce website that provides advanced search functionality, which enables the user to identify and interact with one or more other users in their individual (or collective) capacities as search facilitators. One example of how a search facilitator can facilitate a search includes transmitting the search query to the search facilitator so that she may independently assess the search criteria and offer advice with respect to locating items of interest, or offer suggestions regarding alternative items that are likely to satisfy the user. Another example includes identifying, to the user, one or more search facilitators with whom the user may communicate regarding the search. Accordingly, in one embodiment, the advanced search returns a list of one or more search facilitators to the user in response to a search query. The advanced search may identify the search facilitators using a user profile associated with each search facilitator, where the user profile contains information describing that person's interests, hobbies, items sold or bought, or other data that will associate the person with a particular item or class of items that is being sought by the user.

FIG. 1 illustrates a block diagram of an electronic commerce (also referred to herein as e-commerce) system having advanced search functionality in accordance with one embodiment of the present invention. One or more users 10, each using a client computing system, connect with an e-commerce platform 12 through a network 14, such as the Internet or other communication network. E-commerce platform 12 includes a web server 20, a search engine 22, at least one database 24, an interrogation component 26 and an interactive session component 28. Web server 20 includes software that enables e-commerce platform 12 to generate web pages and otherwise communicate with each user 10 over network 14. Search engine 22 includes software that, in response to receiving search queries from user 10, searches the contents of database 24. Database 24 includes, among other things, listing data associated with each item listed with the e-commerce system, and user data associated with each user of the e-commerce system. For example, the listing data may include a name or title for each item that is listed for sale, a description of the item, information about the seller of the item, a photograph of the item (or other visual representation), information about purchasing the item, and other information.

Each user 10, who may be, for example, a buyer, a seller, or an intermediary, uses a client computing system (not shown) to interact with e-commerce platform 12. Any user 10, regardless of how they are classified, can perform searches within e-commerce platform 12. Although a buyer (or potential buyer) usually initiates a search, buyers, sellers, search facilitators, and other intermediaries may all work in collaboration with one another while searching for an item.

As will be described in further detail below, interrogation component 26 includes functionality, executed by a processor of e-commerce platform 12, that interrogates user 10 after receiving and processing a search query from the user. For example, interrogation component 26 may ask user 10 a series of questions, based on the terms of the search query, that are designed to elicit additional information from the user to refine the search criteria and improve the quality of the search results. Interactive session component 28 includes functionality, executed by a processor of e-commerce platform 12, that enables one user 10 to communicate with another user using the e-commerce platform, for example, to enable a buyer and seller to communicate with one another in real-time.

Figure 2:
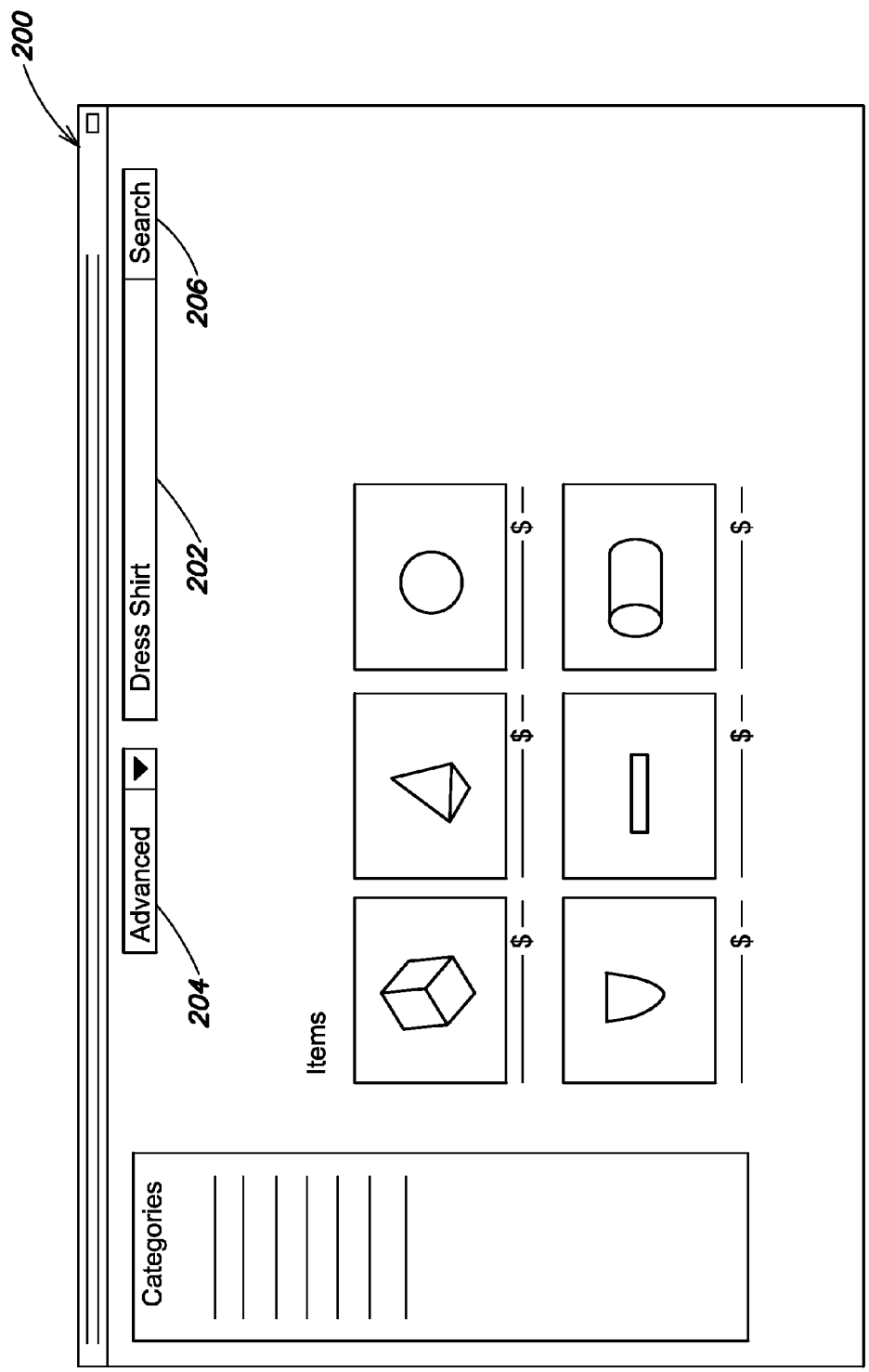
FIG. 2 illustrates an exemplary entry web page generated by the system of FIG. 1.

FIG. 2 illustrates an entry web page 200 of a search engine within e-commerce platform 12. Entry web page 200 is generated by web server 20, as shown in FIG. 1, and transmitted to a client computer of user 10, where the user may interact with the web page. Entry web page 200 includes a search query entry field 202 into which a user enters the terms of a search query (e.g., "dress shirt"), a search type selector 204

(e.g., a drop-down selection list), and a search button 206. The search types provided by search type selector 204 include an advanced search type, or another search type, such as an item category (e.g., "handmade," "vintage," and the like). As shown, search type selector 204 is selected to "Advanced," which will request that an advanced search be performed by search engine 22 based on the search query. Other techniques for selecting the search type may be utilized, for example, a check-box, a radio button, or a special operator included in the search query (e.g., "?"). Search button 206, when selected by the user, submits the search query and the search type to search engine 22 through web server 20 for processing. Search engine 22 produces a set of search results including at least one item that satisfies the search query.

Figure 3:
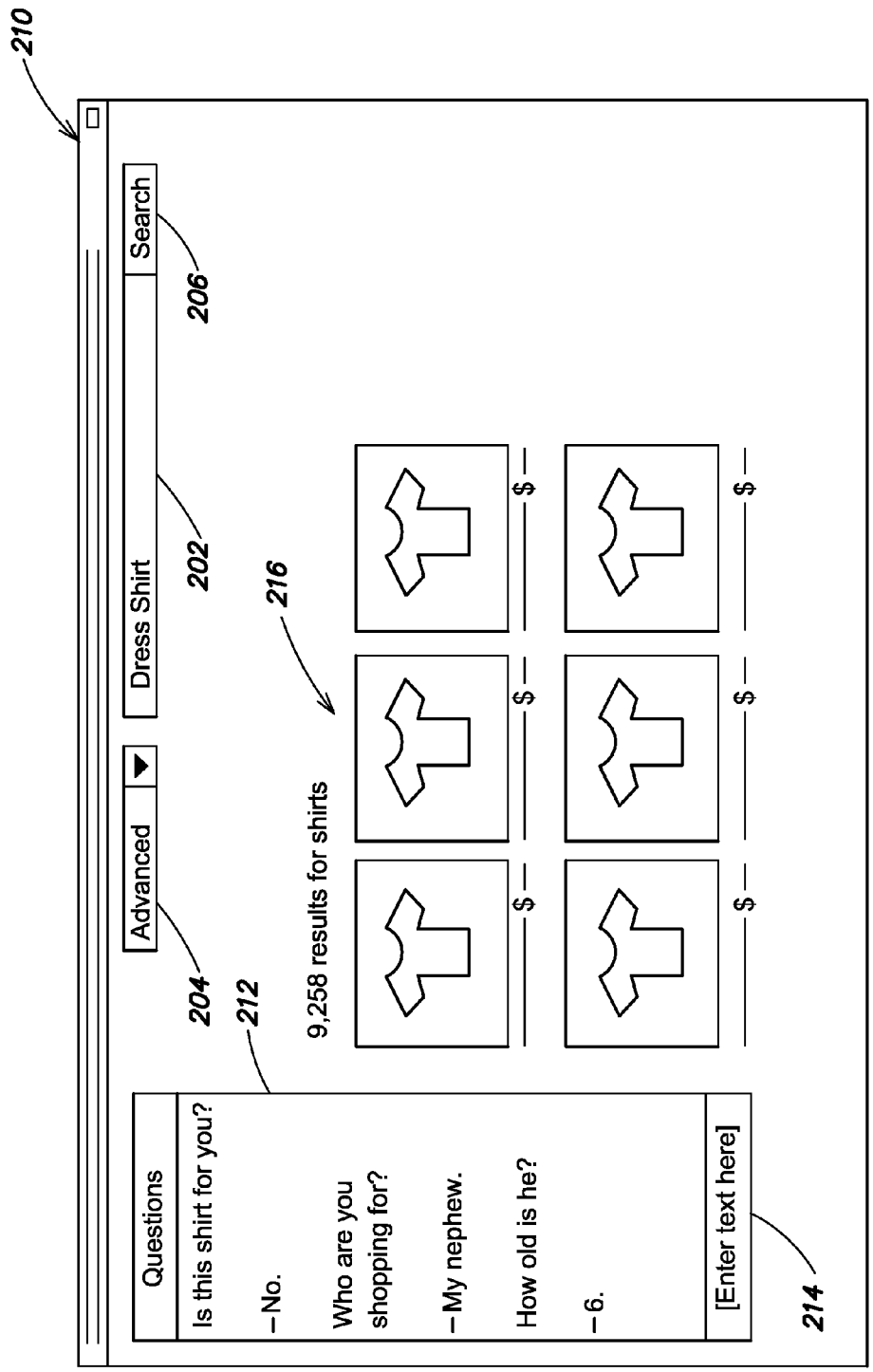
FIG. 3 illustrates an exemplary interrogation web page generated by the system of FIG. 1.

FIG. 3 illustrates an interrogation web page 210 that is generated in response to a search query having an advanced search type that is submitted by user 10 to search engine 22. Interrogation web page 210 includes an interrogation interface 212 and a text entry field 214. Interrogation web page 210 may also include item listings, indicated generally at 216, that are returned by search engine 22 in response to the search query.

Interrogation interface 212 and text entry field 214 are coupled to interrogation component 26, as shown in FIG. 1, through web server 20. One or more questions, which are generated by interrogation component 26, are presented to user 10 through interrogation interface 212. Interrogation component 26 may use heuristic rules to automatically generate the questions. The questions may, for example, take the form of open-ended questions, survey questions, or poll questions (e.g., questions having a set of predefined answers from which the user may choose). The questions are designed to elicit additional information from user 10 regarding the item being sought, for example, additional information that may be used to refine the search. For example, the questions may be used to identify the age, gender, name, or other characteristic of the user or intended recipient of the item being sought; the price, color, size, or other characteristic of the item being sought; or any other information that may be pertinent to the search. Responses to the questions are entered by user 10 in text entry field 214 and transmitted to interrogation component 26.

The questions are automatically generated based on one or more heuristic rules, manually generated by a human operator, or both. For example, the heuristic rules may be developed over time using machine learning or artificial intelligence techniques, such as by identifying which items are most often selected by users who supply similar search queries. The heuristic rules may, additionally or alternatively, be used to identify search facilitators who self-identify or register themselves as specialists with respect to particular items or classes of items. The number and nature of the questions depends on the initial search query, the quality of user responses to the questions, or other factors.

Interrogation component 26 may be used to collect additional information regarding the search, and/or to identify one or more other users 10 who will be able to interactively assist the user with the search using the search query, the additional information, or a combination of both. Once a sufficient amount of additional information has been acquired by interrogation component 26 to identify one or more other users 10, an interactive session is established between the user requesting the search (e.g., the buyer) and one or more other users 10 (e.g., search facilitators), as will be described below with reference to FIG. 4. The amount of additional information needed to identify the one or more other users depends on the nature of the search. It will be understood that interrogation webpage 210 is not necessarily generated in response to all search queries. For example, if the search query itself provides an amount of information that is sufficient to identify the one or more other users 10 that can assist the user in performing the search, then the interrogation webpage 210 is not generated.

Figure 4:
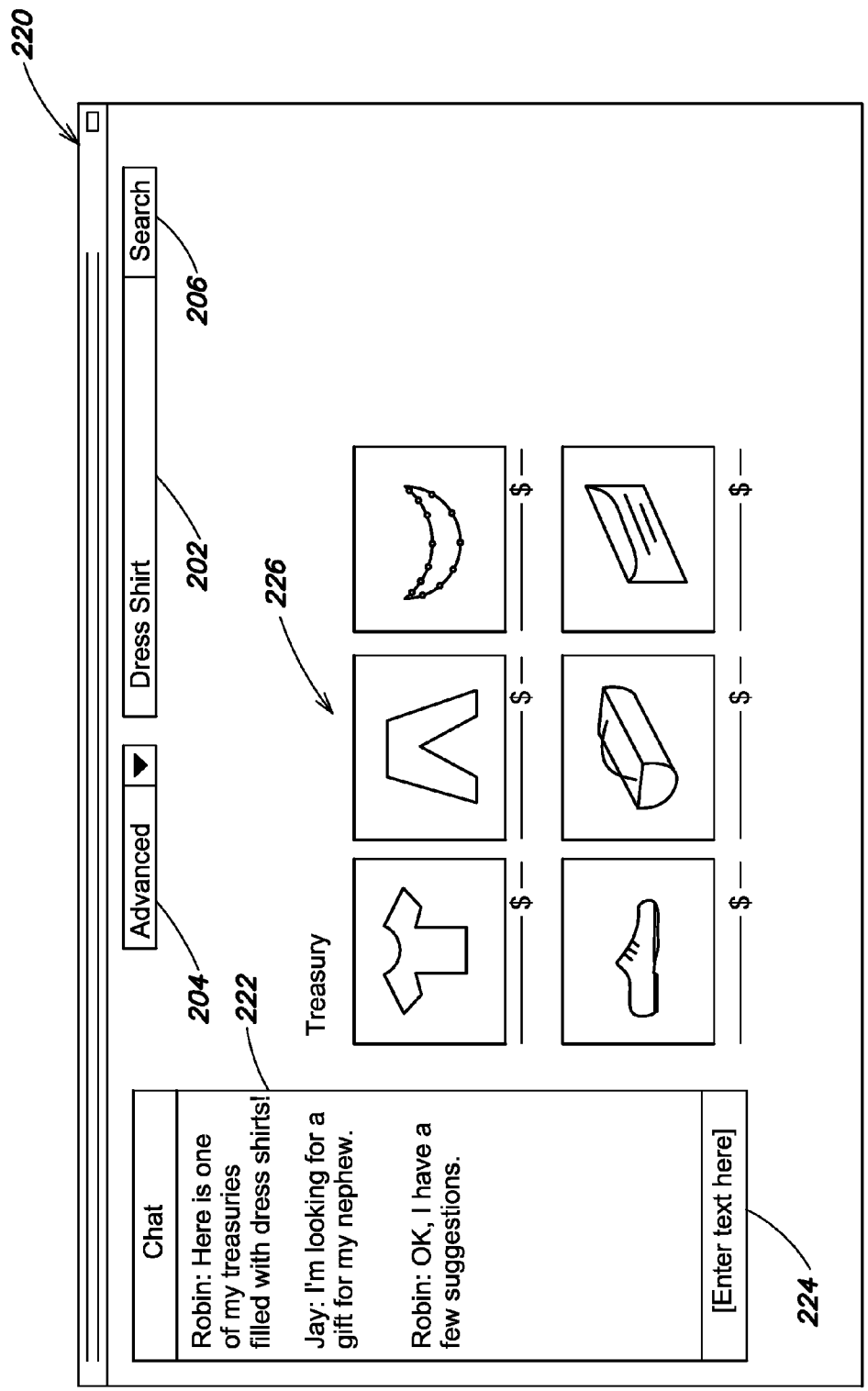
FIG. 4 illustrates an exemplary interactive session web page generated by the system of FIG. 1.

FIG. 4 illustrates an interactive session web page 220 that is generated and transmitted to at least one user 10 (e.g., the user who initiated the search) subsequent to identifying one or more other users that can facilitate the online search (e.g., the search facilitators). Web page 220 includes an interactive session interface 222 and a text entry field 224. Web page 220 may, optionally, include listings for one or more suggested items, as shown generally at 226.

Substantially at the same time as interactive web page 220 is generated, interactive session component 28 initiates an interactive session between multiple users 10, for example, between the buyer and a seller or other user (e.g., a search facilitator), to enable the users to communicate with one another. The communications between users 10 may include any type of communication (e.g., text, graphics, video, and/or voice). Users 10 may use the interactive session to discuss the item being sought, or other topics that potentially will assist with identifying, locating, and/or obtaining the item being sought, or other items. For example, a seller or other search facilitator may ask the buyer a series of questions related to the search query. Based on the responses to the questions, the seller may present one or more suggested items to the buyer for his or her consideration. The suggested items may be presented as a listing (e.g., listing 226) from which the buyer may select one or more items to review and/or purchase. In other embodiments, the suggested items may also be sent to the user by electronic mail, instant message, or through other communication channels. In yet another embodiment, one or more of the suggested items may be automatically placed into an electronic shopping cart of the user.

According to another embodiment of the present invention, in an e-commerce system, a set of advanced search results can be provided in response to a search query performed by a user. The set of advanced search results includes a list of resources, which are to be identified by the e-commerce system, that the user can potentially call upon to facilitate locating and acquiring a particular item or items. Such resources may include people, businesses, or other entities both within and without the online community. The list of resources is presented to the user through a user interface, and the user then has the option of calling upon one or more of the resources to assist with the search by selecting one or more of the resources from the list of resources. For example, if the user enters a search query for dress shirts, the list may include sellers, businesses, or other sources of dress shirts that the user may transact with to obtain the item. The user may then, optionally, request search assistance from one or more of the resources in the list. The request may, for example, be in the form of a communication that is sent to the resource which includes the terms in the search query, or other information that the user wishes to include.

According to another embodiment of the present invention, in response to the search query, the list of resources includes a list of people who are known to be proficient at locating items related to a user's search query. Such people are sometimes referred to as "personal shoppers," who are people who help others shop for products or services by providing advice, offering suggestions, and/or facilitating purchases based on the customer's requests. Personal shoppers may have particular experience or expertise in certain areas, such as clothing, furniture/home decor, or hobbies, although this is not necessarily always the case. Therefore, personal shoppers are often in a unique position to assist a shopper who is trying to locate a particular item of interest, or in some cases, to assist the shopper in identifying items that may be of interest to the shopper based on their search query. For example, personal shoppers may be identified by a comparison between the search query or the items returned by the search and a profile associated with each personal shopper, the profile to contain one or more parameters that may be compared to a search query or the results of a search query (e.g., where a personal shopper has previously assisted others with the same or similar search query, where a personal shopper has previously recommended the items of interest to other users, or where a personal shopper has an affiliation with a seller who sells the items of interest). To that end, a search engine may provide a list of one or more people (e.g., personal shoppers) who the user may subsequently engage for assistance with the user's search, in addition to, or instead of, a conventional list of items for sale that is automatically generated to match the user's search query. The list of people may be generated from a database that includes the identities other users, for example, sellers in an online marketplace.

According to one embodiment, an e-commerce system includes a database of items for sale by various users of the system. The users may include sellers as well as buyers, who collectively form an online community centered around the marketplace provided by the e-commerce system. Some members of the online community can be identified by the e-commerce system as being particularly knowledgeable with respect to certain items, using various techniques. For example, a seller who frequently offers dress shirts for sale may be identified as someone who is particularly knowledgeable about dress shirts, and therefore represents a person who may potentially assist, or facilitate, a buyer who is searching for a dress shirt. In another example, a seller of baked goods may be identified as someone who can help a buyer purchase homemade brownies, made either by the seller herself, or by someone else who is known to the seller. In yet another example, user of the system who is a frequent buyer of greeting cards may be identified by the system as a good potential source of information for others who are looking for greeting cards.

In another embodiment, an electronic communication (e.g., an electronic message, e-mail, instant message, or the like) is transmitted to one or more recipients, including any of the people, resources, or both in the list of the advanced search results. The communication is only sent at the option of the user, in response to receiving the set of advanced search results, and only to the people and/or resources that are selected by the user. The communication can be used to request assistance with the search from the selected people and/or resources, or to send another message. For example, the communication may include the search query that was used to generate the set of advanced search results, the set of advanced search results, or a combination of these. The recipient of the communication may use the search query, or any other information provided in the communication, to facilitate the search. Any one or more of the recipients may respond to the request for assistance in one or more ways, including, but not limited to, suggesting a particular item, suggesting a merchant who can provide the particular item, suggesting alternative items that may satisfy the user.

In yet another embodiment, the search query and/or the set of advanced search results is automatically provided to one or more of the people and/or resources so that they can independently facilitate the search. The search query is provided through a user interface of e-commerce system, through an electronic communication (e.g., e-mail, text message, instant message, among others), or through another communications agent. The search query can be assessed by the recipient of the search query. Using their specialized knowledge, the recipient may augment or modify the query in a way that generates another set of search results including one or more items that may be of interest to the user (e.g., a set of search results that is customized for the user by the recipient of the search query). The recipient may reply to the user in at least one of several ways, including, but not limited to, suggesting an alternate search query, providing the results of a search using the alternate search query, or providing another message, such as a request for more information about the item sought by the user. By involving other people and/or resources in the search, in particular knowledgeable ones, their subjective judgments and recommendations can be included in the search, which may improve the search results. For example, such people may be aware of alternative search terms that will potentially lead to improved results for the searcher, and either offer the alternative search terms as a suggestion to the searcher, or perform a separate search using the alternative search terms, and offer the results of that search to the searcher. Further, such search results can lead to increased user satisfaction because the social nature of the search process lends itself to a more gratifying shopping experience.

According to one embodiment, the resources may include one or more curated lists that are created by, for example, members of the online community or others, each curated list containing items of a particular type, style, theme, color, texture, material, purpose, use, specification, technique (e.g., construction or manufacturing technique), location, or other category. One non-limiting example of a curated list is an electronic list of items that are manually selected by a user of the e-commerce website (e.g., a seller, a buyer, or other user) and made available for one or more other people to view. The items included in the curated list may be selected for any reason, for instance, items that members find interesting, or items that share a common theme (e.g., items for decorating a dining room) or share a common purpose or use. For example, a member may create a list dress shirts that are available for sale within the online marketplace. The list may be created using the member's specialized knowledge of dress shirts, such as types, styles, colors, fabrics, manufacturers, brand names, sellers, quantities, or other characteristics. The member may or may not be a seller of dress shirts, or of a particular dress shirt that is included in the curated list. However, the member may have specialized knowledge about dress shirts that enables her to provide advice or suggestions to others who are seeking a particular dress shirt, or to others who are shopping for dress shirts. The curated list provides a new mechanism for facilitating a search for dress shirts. The curated list may be returned as part of a set of search results, or separately in response to a search query that is sent to the member who creates the curated list.

In another embodiment, an online search engine provides a list of people who are known to be proficient at locating items related to a user-provided search query, such as described above. Those people may be members of an online commerce community or marketplace, for example, registered users of an e-commerce website, including buyers and sellers. As an incentive for offering personal shopping services to other users, the online commerce platform offers an affiliate fee to anyone who offers to assist, or actually assists, other users in locating an item. The affiliate fee may, for example, be a percentage of the actual selling price of the item that is purchased by the user who received personal shopping assistance, or it may be a flat or fixed fee. Other non-limiting examples of the basis of an affiliate fee include: volume or quantity of items sold, brand(s) of item(s) sold, profit or loss on each item sold, new/old inventory sold, time spent assisting the user, number of instances assistance was offered or actually provided, or other factors. The affiliate fee may be paid by the user, or by the online commerce service, upon completion of a transaction wherein the user purchases an item that was recommended by the personal shopper, or purchases an item from another person or entity that was recommended by the personal shopper.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the scope of the invention. Accordingly, the foregoing description and drawings are by way of example only.

What is claimed is:

1. A method of searching an electronic commerce website, the method comprising acts of:
   receiving, from a client computing system, through a network, by a computing system of an electronic commerce platform, a search query for an item and a request for advanced search results from a user;
   responding to the request for advanced search results by searching a plurality of user profiles in a database of the electronic commerce platform based upon the search query for the item, the plurality of user profiles comprising profiles of users other than the user;
   identifying at least one search facilitator profile among the plurality of user profiles, the at least one search facilitator profile representing at least one search facilitator who can assist the user in locating the item within the electronic commerce website;
   establishing, by execution of instructions by a processor of an interactive session component of the electronic commerce platform, an interactive online session between the user and the at least one search facilitator; and
   presenting one or more suggested item listings selected by the at least one search facilitator to the user through a user interface of the electronic commerce website on the client computing system.

2. The method of claim 1, further comprising an act of interrogating the user, through the user interface, by an interrogation component of the electronic commerce platform which includes functionality, executed by a processor of the electronic commerce platform, that interrogates the user for additional information about the item prior to the act of searching, wherein the act of searching is further based upon the additional information.

3. The method of claim 2, wherein the act of interrogating includes presenting, within the user interface of the electronic commerce website, one or more questions to the user, the one or more questions to be generated based on heuristics rules applied to at least one of the user-supplied search query and one or more user-supplied responses to each of one or more previously presented questions, and wherein the additional information is received from the user in response to presenting the one or more questions.

4. The method of claim 3, wherein the one or more questions are survey questions.

5. The method of claim 3, wherein the one or more questions are poll questions.

6. The method of claim 3, wherein the act of interrogating further includes generating a web page having a user interface configured to enable the user to receive and respond to the act of interrogating.

7. The method of claim 2, wherein the act of interrogating includes presenting, within an interface of the electronic commerce website, one or more questions to the user, the one or more questions to be manually generated based on at least one of the user-supplied search query and one or more user-supplied responses to each of one or more previously presented questions, and wherein the additional information is received from the user in response to presenting the one or more questions to the user.

8. The method of claim 1, wherein the act of establishing an interactive online session includes generating a web page having a user interface configured to enable the user to communicate with the at least one search facilitator.

9. The method of claim 8, wherein the interactive online session is one of a web chat session, an instant messaging session, and a teleconference.

10. The method of claim 1, wherein the act of providing for the at least one search facilitator to present the one or more suggested item listings to the user includes generating a web page configured to display the one or more suggested item listings.

11. The method of claim 1, wherein the at least one search facilitator is a person who has prepared a curated list having items related to the search query.

12. A non-transitory computer readable medium having computer-executable instructions stored thereon for operating an electronic commerce system, the computer-executable instructions when executed by a computer causing the computer to perform a method comprising acts of:
   causing a search engine to search a user database storing a plurality of user profiles based on a search query for an item, the search query supplied by a user from a client computing system, through a network, to a computing system of the electronic commerce system, the plurality of user profiles comprising profiles of users other than the user, the search engine identifying at least one search facilitator profile among the plurality of user profiles, the at least one search facilitator profile representing at least one search facilitator who can assist the user in locating the item among a plurality of items listed within the electronic commerce system;
   causing an interactive session component to establish, an interactive online session between the user and the at least one search facilitator; and
   causing a web server component to generate a web page including one or more suggested item listings to be presented by the at least one search facilitator to the user.

13. The non-transitory computer readable medium of claim 12, wherein the method further comprises causing an interrogation component to interrogate the user for additional information about the item prior to identifying the at least one search facilitator, wherein the search engine is further configured to search the user database based upon the additional information.

14. The non-transitory computer readable medium of claim 13, wherein the additional information about the item includes at least one of a size of the item, a color of the item, a quantity of the item, a texture of the item, a material of the item, a method of construction of the item, a method of manufacture of the item, a purpose for the item, a use of the item, a theme of the item, a style of the item, and a location of the item.

15. The non-transitory computer readable medium of claim 13, wherein the interrogation component is configured to interrogate the user using at least one of a survey question, a poll question, an open-ended question, and a manually generated question based on at least one of the user-supplied search query and one or more user-supplied responses to at least one of a previously presented survey question, a previously presented poll question, a previously presented open-ended question, and a previously presented manually generated question.

16. The non-transitory computer readable medium of claim 12, wherein the interactive session component is further configured to generate a web page having a user interface configured to enable the user to communicate with the at least one search facilitator.

17. The non-transitory computer readable medium of claim 16, wherein the interactive online session is one of a web chat session, an instant messaging session, and a teleconference.

18. A non-transitory computer readable medium having computer-executable instructions stored thereon for searching an electronic commerce website, the computer-executable instructions when executed by a computer causing the computer to perform a method comprising acts of:
   searching a plurality of user profiles based upon a search query for an item, the search query supplied by a user, the plurality of user profiles comprising profiles of users other than the user;
   identifying at least one search facilitator profile among the plurality of user profiles, the at least one search facilitator profile representing at least one search facilitator who can assist the user in locating the item within the electronic commerce website;
   establishing an interactive online session between the user and the at least one search facilitator; and
   presenting one or more suggested item listings selected by the at least one search facilitator to the user through the electronic commerce website.

\* \* \* \* \*

UNITED STATES PATENT AND TRADEMARK OFFICE
CERTIFICATE OF CORRECTION

| | | |
|---|---|---|
| PATENT NO. | : 8,762,217 B2 | Page 1 of 1 |
| APPLICATION NO. | : 12/951660 | |
| DATED | : June 24, 2014 | |
| INVENTOR(S) | : Robert Kalin | |

It is certified that error appears in the above-identified patent and that said Letters Patent is hereby corrected as shown below:

In the Specification:

At Column 4, line number 51, delete "wilds" and insert --wikis--.

Signed and Sealed this
Twenty-fifth Day of November, 2014

Michelle K. Lee
*Deputy Director of the United States Patent and Trademark Office*